Feb. 6, 1940.  E. F. BACON  2,189,527
REMOTE RADIO CONTROL
Filed Aug. 21, 1936  3 Sheets-Sheet 1
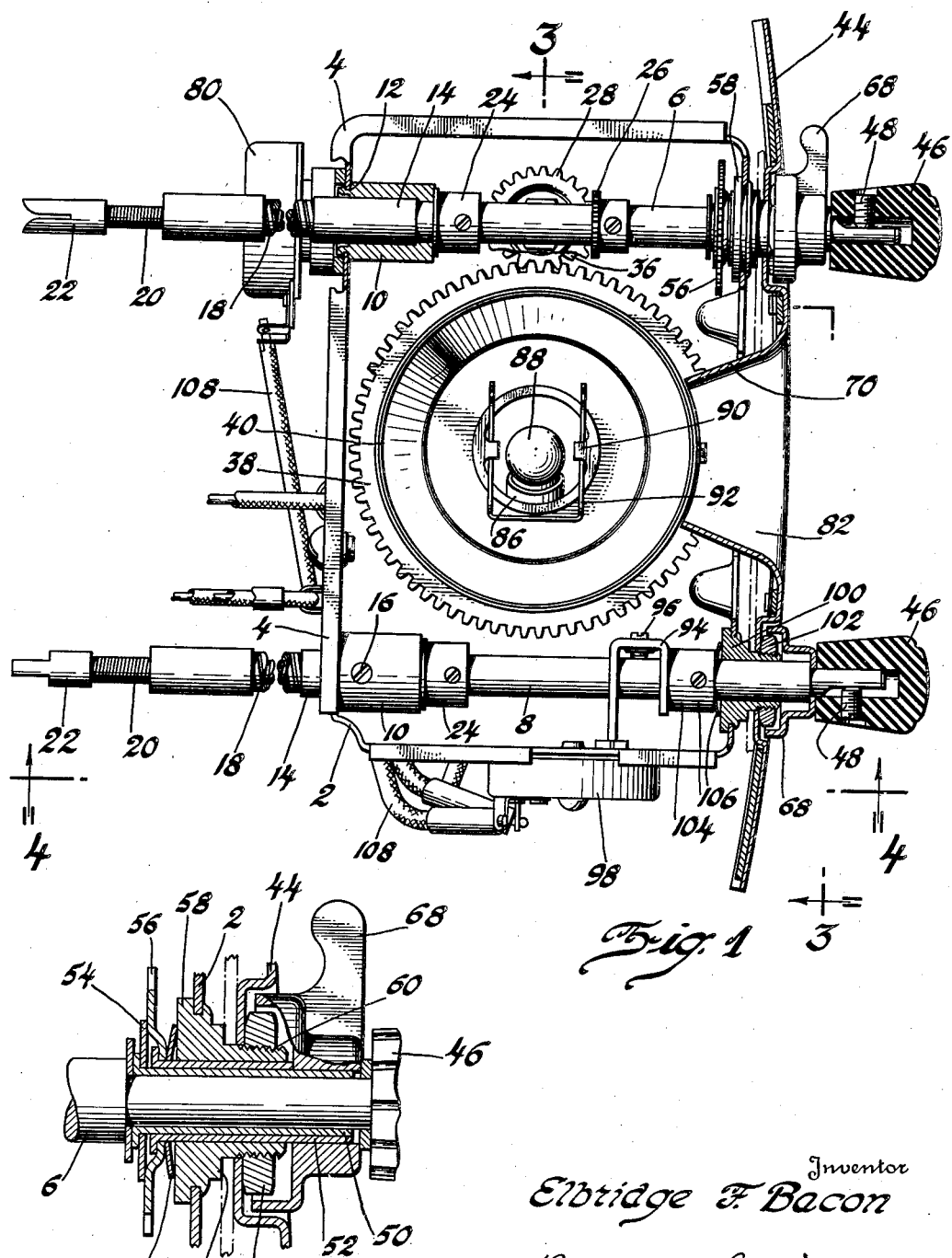
Inventor
Elbridge F. Bacon
By Blackmore, Spencer & Flint
Attorneys Feb. 6, 1940. E. F. BACON 2,189,527
REMOTE RADIO CONTROL
Filed Aug. 21, 1936 3 Sheets-Sheet 2

Inventor
Elbridge F Bacon
By Blackmore, Spencer & Flint
Attorney

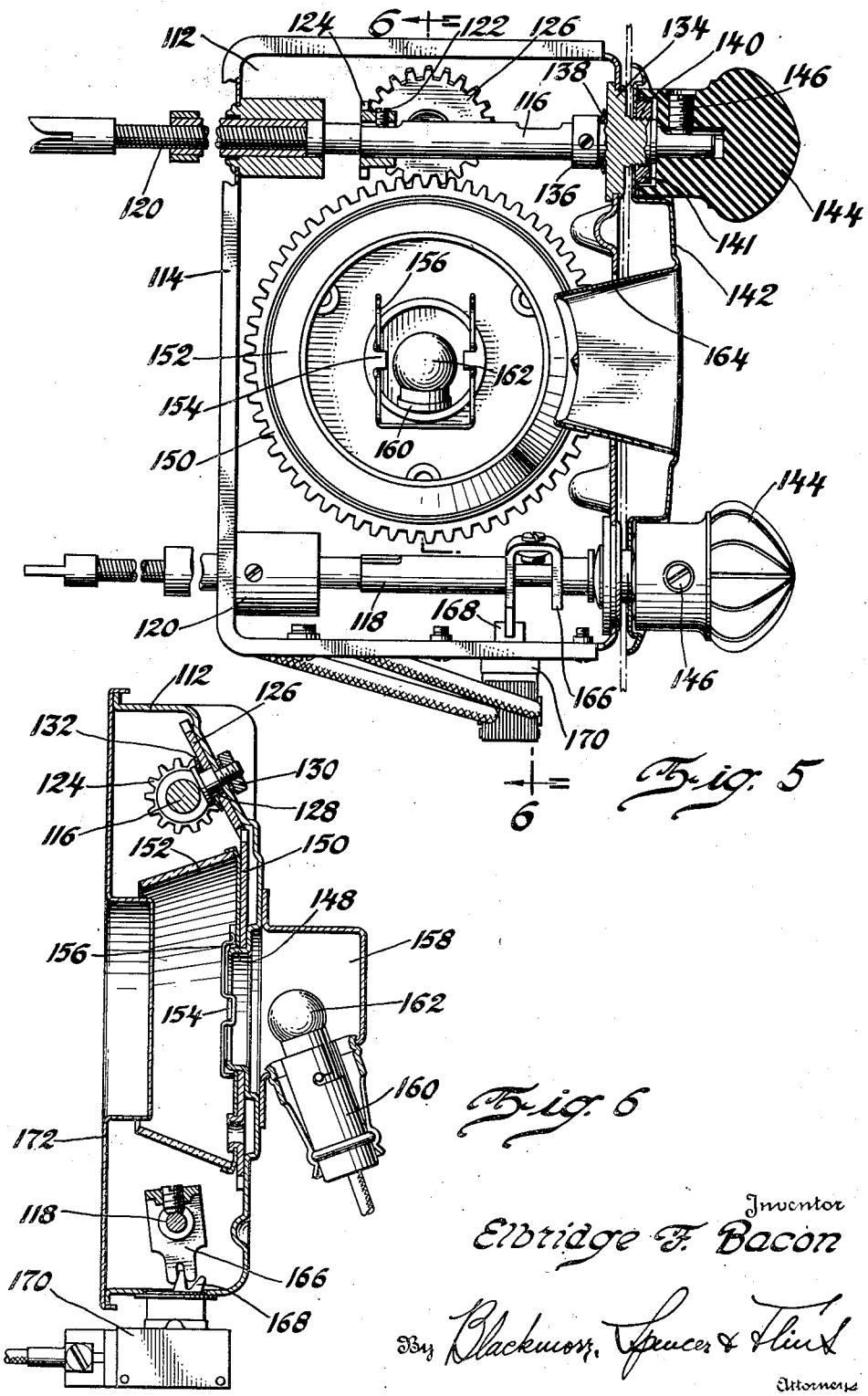

Patented Feb. 6, 1940

REISSUED
JUN 24 1940

2,189,527

UNITED STATES PATENT OFFICE 2,189,527

REMOTE RADIO CONTROL

Elbridge F. Bacon, Flint, Mich., assignor to General Motors Corporation, Detroit, Mich., a corporation of Delaware Application August 21, 1936, Serial No. 97,115

2 Claims. (Cl. 250—20)

This invention relates to control and indicating apparatus for adjustably actuating other means at a remote point and more specifically to remote control and indicating means for controlling a distant radio receiver.

With the increasing popularity and use on automotive vehicles of radio receivers the problem of developing a practical remote assembly of pleasing appearance has been given attention. It is now common practice to mount the radio chassis on the dashboard under the cowl and this of course necessitates the use of remote control as the set itself is so inaccessible that no one in the front seat of the car could reach down and forward to tune the set much less anyone driving the car.

It is therefore an object of my invention to provide remote control apparatus which is easily accessible to the operator and of pleasing appearance.

It is a further object of my invention to provide remote control apparatus in which several controlling means are mounted on the same shaft to reduce the number of control parts.

It is a still further object to provide clearly visible indicating means for adjustment properly illuminated.

With these and other objects in view my invention resides in the embodiments described in the specification and claims and illustrated in the accompanying drawings, in which:

Figure 1 is a side elevation of a remote control assembly, parts being broken away and shown in section.

Figure 2 is an enlarged detail section through the shaft support assembly of the upper shaft in Figure 1.

Figure 5 is a side elevation of a modified form of control assembly, parts being broken away and shown in section.

Figure 6 is a sectional view taken on the line 6—6 of Figure 5.

Figure 3:
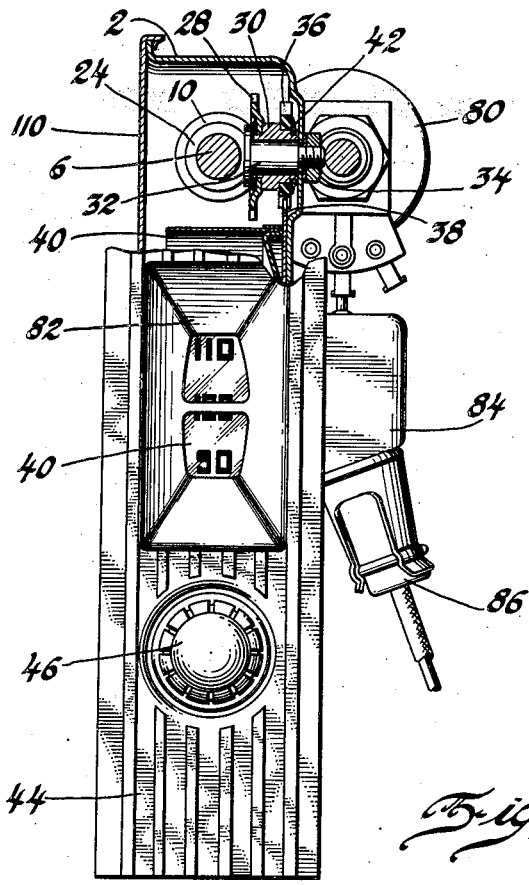
Figure 3 is a sectional view taken on line 3—3 of Figure 1.

Remote control panels for automotive radio in order to be easily accessible and visible to the operator and driver of the car are best placed on the instrument panel. In order to provide for this attachment on the more recent cars openings are provided for this attachment in the instrument panel at the factory and if the car is not equipped with a radio receiver a decorative plate is secured thereto which may be removed at any time to allow the attachment of the control panel.

The casing of the assembly is a comparatively thin rectangular box 2 formed of pressed metal, one side thereof being open and flanged outwardly as at 4. A pair of parallel shafts 6 and 8 extend through aligned openings in the front and rear walls of the casing, both of these shafts being rotatable for control purposes. A bushing 10 has an end portion fitting within an opening 12 in the rear face of the casing, the end being crimped outwardly around the edge to secure the bushing in place. Within the bushing is carried a stationary end terminal 14 of a Bowden wire control, said terminal being secured therein by a set screw 16. To the terminal is connected one end of a flexible outer casing 18 which conceals the inner control shaft 20 which is connected to a desired part of the radio set by the connector 22.

The bushing 10 extends past the inner end of the terminal 14 and then is of smaller internal diameter to snugly fit the shaft. A collar 24 is secured to shaft 6 adjacent the inner face of the bushing to hold the bushing portion of smaller diameter between the terminal end 14 and the collar 24 to prevent end play in the shaft.

Spaced forwardly and secured to the shaft 6 is a spur gear 26. This gear meshes with a gear 28 mounted on a cylindrical sleeve 30 which in turn is rotatably secured to the rear face of the casing by stud 32 and nut 34. Also secured to the sleeve 30 in spaced relation to the gear 28 is a second gear 36 constructed of celoron for quietness in operation which meshes with a large gear 38 rigidly secured to the drum dial 40, the assembly of the dial and gear being rotatably mounted on the rear face of the casing in any desired manner.

The two gears 28 and 36 are mounted on the cylindrical sleeve, the first rigid therewith and the second so that it may, under certain conditions, rotate with respect thereto. A spring washer 42 at the top takes up end play and the lower washer 42 keeps the gear 36 in contact with a shoulder on the sleeve. This construction is provided so that the turning of the shaft 6 too far will not cause a stripping of the gears but the same may slide and provide for some excess travel.

The forward end of the shaft 6 extends through the casing, through the instrument panel when mounted (shown in dotted lines) and through the decorated cover plate 44 and has secured to its outer end an operating knob 46 by set screw 48. The section of the shaft extending through the frame is of smaller diameter than the remainder of the shaft and it has a plurality of apparatus mounted adjacent thereto which will now be described in detail and is best shown in Figure 2.

Surrounding the reduced portion of the shaft are two telescoping sleeves 50 and 52 which act as a bearing for the shaft, the latter being rotatable within the inner stationary sleeve. The inner sleeve is longer than the outer and at the end within the casing both sleeves are flanged outwardly and carry between the two spaced flanged ends a washer 54. Adjacent the flanged end of the outer sleeve 52 is carried a gear member 56 which is rotatable with this sleeve. This sleeve and shaft assembly extends through the central bore of an irregularly shaped bushing 58, the larger outside diameter of which is rigidly secured to the casing. The opposite end of the bushing is threaded exteriorly as shown at 60 and has a shoulder 62 adjacent the middle portion. A section of the instrument panel fits against the shoulder, the bushing extending through an opening in the panel. The cover plate 44 also has an opening through which this portion of the bushing extends and the instrument panel and cover plate are clamped to the assembly by a nut 64 which presses them against the shoulder 62 and is threaded on the section 60.

Mounted on the sleeve 52 between the gear 56 and the bushing 58 is a dished spring washer 66 adapted to keep the gear 56 in contact with the flange on sleeve 52 so that it will rotate therewith and to take up all end play. On the outer end of the sleeve 52 is mounted a lever arm 68 which is just behind the knob 46. With this construction it is evident that the knob may be used to turn the shaft 6 for turning the indicating dial and tuning the set and that the lever 68 may also be turned independently to control tone control means on the casing and due to the fact that the sleeve 50 is stationary the rotation of either will not disturb the other. The operation of the tone control means will now be set forth in detail and is best shown in Figure 4.

Figure 4:
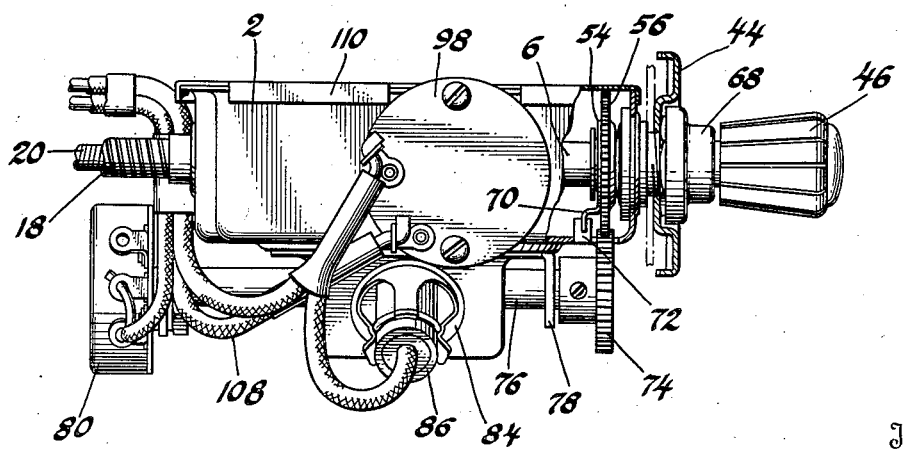
Figure 4 is an end view of the apparatus taken on line 4—4 of Figure 1.

The washer 54 is securely fastened to the inner stationary sleeve and has an arm 70 extending therefrom as best shown in Figure 4. This arm is secured to a lug 72 on the casing which anchors the sleeve against rotation. The gear 56 meshes with gear 74, carried by shaft 76, carried by apertured lug 78 on the outer casing face, said shaft lying parallel to shaft 6 and extending back to operate a tone control means 80 on the rear face of the casing.

The forward face of the casing 2 has a large opening therethrough and the cover plate has an inwardly bent portion extending through this opening of roughly truncated conical form as shown at 82 which approaches the dial 40 and provides a visible window through which to view the indicating dial.

Secured to the face of the casing 2 at the approximate center thereof is a suitable light housing 84 by soldering or welding, having a socket 86 and lamp 88 therein. The lamp projects through an opening in the casing and the central portion of the dial to illuminate the numerals on the cylindrical edge from within. The casing 2 adjacent the opening has a pair of projecting lugs 90 under which a U-shaped spring member 92 engages, the other portions of the spring engaging the dial support to maintain the dial in its proper position.

The other control shaft 8 is connected to the same type of remote Bowden wire control in the same manner and therefore like reference characters have been applied to these parts and no further explanation will be made.

On the shaft 8 toward the right as shown in Figure 1 is a U-shaped bracket 94 held to the shaft by a set screw 96, one arm of the bracket extending out to engage and operate an off and on switch 98 secured to the end face of the casing.

The forward end of shaft 8 projects through the bushing 100, similar to bushing 58, which is carried by the casing 2 and the cover plate and instrument panel are clamped to the bushing 100 as in the previous case by a nut 102. A collar 104 is applied to the inner portion of the shaft adjacent the bushing and a spring washer 106 is located between the collar and bushing to eliminate end play in the shaft. A similar knob 46 is applied to the projecting shaft end and clamps to the shaft a cover member for the nut 102. Suitable wires such as 108 are provided for connecting the switch and tone control to the chassis proper. A cover 110 is positioned over the open side of the casing and the edges are crimped over the flanged edge 4 to secure the whole together.

It is therefore evident that with the device as shown and described the upper knob in Figure 1 controls the tuning of the set, the associated lever controls the tone control and the lower knob controls both the off and on switch and the volume control through different periods of its rotation.

A modified form of my invention is illustrated in Figures 5 and 6 and in this structure a casing 112 is provided of substantially the same shape as before carrying a flange 114 around the upper edge. Two parallel shafts 116 and 118 extend through the casing from front to rear and have connected to their rear extremities Bowden wire control means 120 of the same type as previously described for connection to the radio chassis, that from shaft 116 operating the tuning mechanism and that from 118 operating the volume control.

Keyed to the shaft 116 slightly to the rear of the center by set screw 122 is a spur gear 124 which meshes with an intermediate gear 126 which is carried by stud 128, the latter being secured to the casing by a nut 130. A spring washer 132 is provided on the stud between the head thereof and the gear 126 to prevent end play on the stud.

The casing 112 carries a bushing 134 therein through which the forward end of shaft 116 projects and there is provided a collar 136 on the shaft adjacent the bushing and a spring washer 138 between the two around the shaft to prevent end play. As before the forward portion of the bushing is externally threaded as at 140 and a nut 141 applied thereto clamps the instrument panel and decorative cover plate 142 between the nut and the main body of the bushing. Secured on the projecting end of the shaft 116 is a control knob 144 by set screw 146.

The central surface of one of the main faces of the casing 112 is flanged as at 148 to provide a bearing surface for a large gear 150 which meshes with intermediate gear 126 and which is rigidly secured to dial means 152. The central part of the flanged portion is apertured and has two projecting portions 154 extending into the aperture and engaging the arms of a U-spring 156 which arms engage the dial plate to hold it in place. To the outer face of the casing adjacent the central aperture is secured a housing 158 for a socket 160 and a lamp 162 whose function it is to illuminate the interior of the dial. The cover plate 142 which extends across the face of the assembly has an inwardly pressed portion 164, the inward portion of which is open and lies adjacent the dial face so that the numerals may be viewed therethrough.

The shaft 118 has secured thereon a U-shaped member 166 which is adapted to throw the operating toggle arm 168 of the switch 170 in either direction. The shaft and knob support for the shaft 118 is substantially the same as that of the upper knob and shaft. A cover 172 is applied to the open side of the casing and is crimped over the flanged edge to secure it in place.

I claim:

1. In a remote control for a radio receiving set, a casing having a pair of rotatable shafts mounted therein, flexible cables connected to the shafts for operating the control members of the radio receiving set, a rotatable dial mounted in the casing, a train of gears interconnecting one of the shafts and the dial, a switch mounted on the case, a member on the other shaft for operating the switch, a third rotatable shaft for operating additional control means for the set, and a rotatable sleeve mounted on the first shaft and connected to the third shaft for operating the same.

2. In a remote control for a radio receiving set, a casing, a pair of rotatable shafts mounted in the casing, flexible cables connected to and operated by the shafts for operating control members of the radio receiving set, a rotatable dial in the casing, means interconnecting one of the shafts and the dial to drive the same, a sleeve rotatably mounted on the last-named shaft, a third control shaft rotatably mounted in the casing and gearing connecting the sleeve and third shaft to operate the same.

ELBRIDGE F. BACON.